United States Patent [19]

Waller et al.

[11] 4,312,616
[45] Jan. 26, 1982

[54] CHIP CATCHING WASHERS

[75] Inventors: Campbell E. Waller, Eltham; Keith E. Watts, Brunswick, both of Australia

[73] Assignee: McPherson's Limited, Melbourne, Australia

[21] Appl. No.: 67,206

[22] Filed: Aug. 16, 1979

[30] Foreign Application Priority Data

Aug. 16, 1978 [AU] Australia .............................. PD5519
Dec. 4, 1978 [AU] Australia .............................. PD6990
Jul. 11, 1979 [AU] Australia .............................. PD9537

[51] Int. Cl.$^3$ ...................... F16B 25/00; F16B 43/00
[52] U.S. Cl. .................................... 411/387; 411/542
[58] Field of Search ................ 85/41, 47, 50 R, 1 JP, 85/1 P, 1 R, 10 E; 10/10 R, 27 R; 151/38; 411/387, 542

[56] References Cited

U.S. PATENT DOCUMENTS

| | | | |
|---|---|---|---|
| 1,652,648 | 12/1927 | Swangren | 85/50 R |
| 3,469,490 | 9/1969 | Pearce, Jr. | 85/1 R |
| 3,500,713 | 3/1970 | Bell | 85/41 |
| 3,516,323 | 6/1970 | O'Brien | 85/10 E |
| 3,869,219 | 3/1975 | Wilson et al. | 85/47 X |
| 4,157,674 | 6/1979 | Carlson et al. | 85/1 R |

FOREIGN PATENT DOCUMENTS

| | | | |
|---|---|---|---|
| 2433875 | 2/1975 | Fed. Rep. of Germany | 85/1 JP |
| 2611395 | 7/1977 | Fed. Rep. of Germany | 85/41 |

*Primary Examiner*—Ramon S. Britts
*Attorney, Agent, or Firm*—Schuyler, Banner, Birch, McKie & Beckett

[57] ABSTRACT

According to the present invention, a washer is provided for a self drilling screw or like fastening device through which the fastening device passes, said washer defining a cavity capable of capturing the retaining drill chips as they are formed. The washer may include means for positively locating the washer on and over the drill point of the fastening device. The cavity can be formed by a skirt region adapted to surround the fastening device and in one aspect the cavity may include a mastic or like substance capable of securely holding drill chips.

13 Claims, 9 Drawing Figures

U.S. Patent  Jan. 26, 1982  Sheet 1 of 2  4,312,616
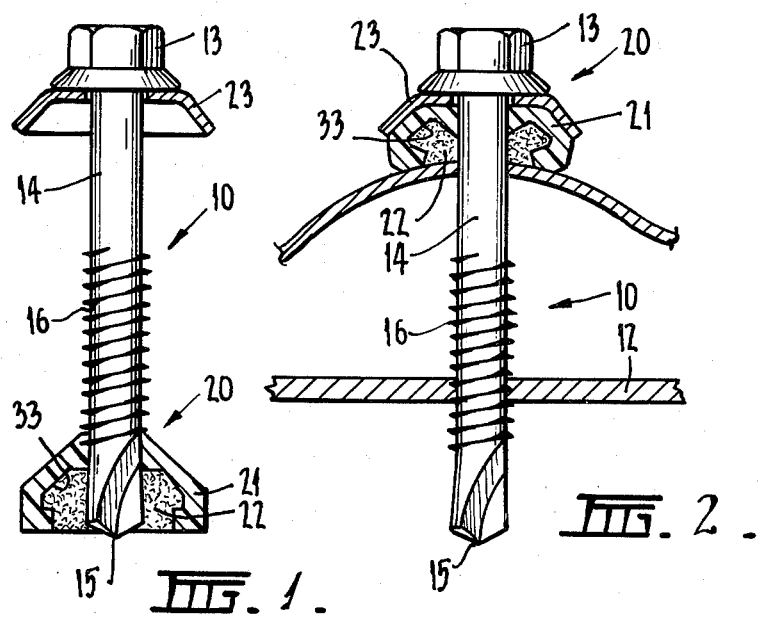
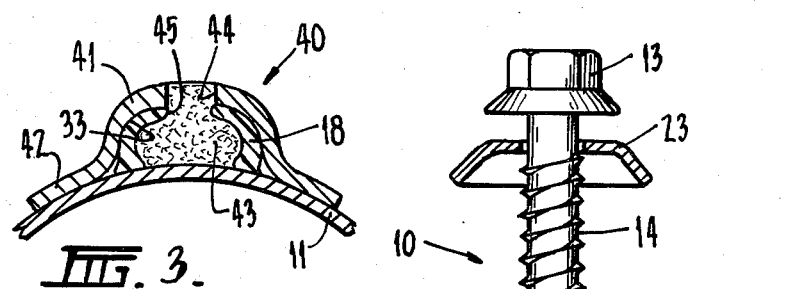
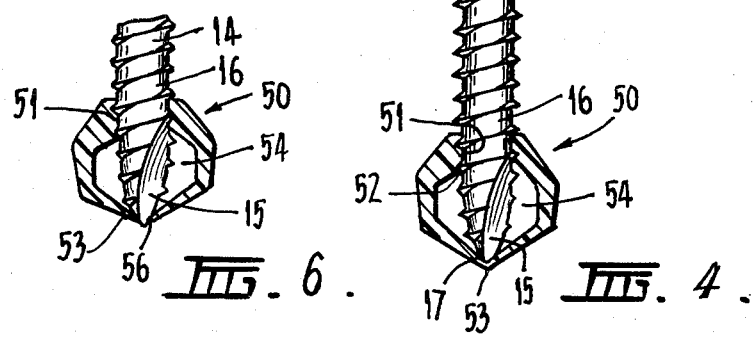

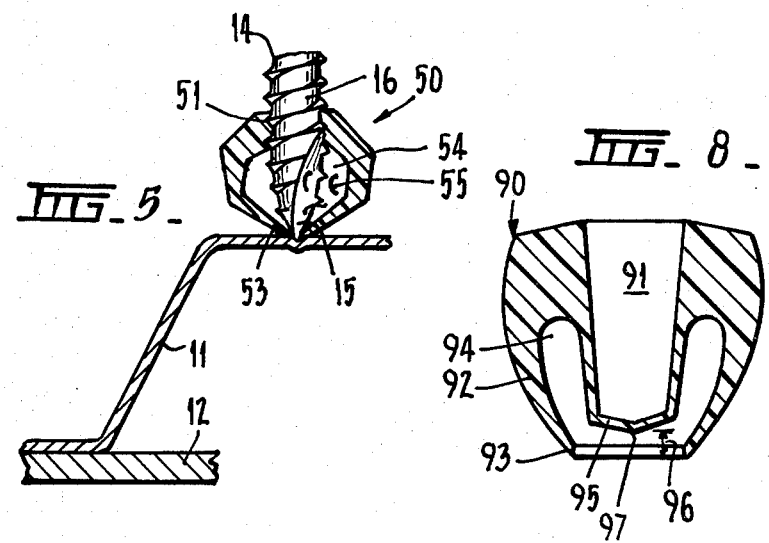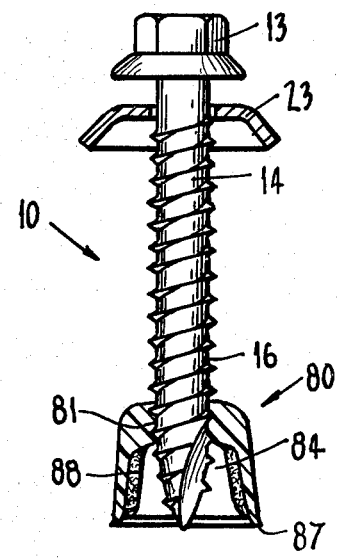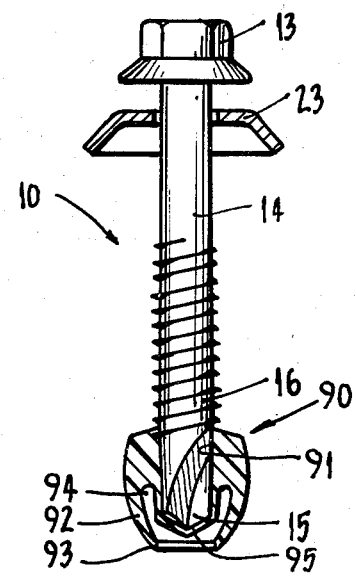

CHIP CATCHING WASHERS

The present invention relates generally to the field of washers and is particularly directed towards providing a washer capable of catching and retaining particles formed during operating of self drilling fastening members such as self drilling screws.

Conventional self drilling screws consist of a driving head, an at least partially screw threaded shank and a drill point at the end of the shank opposite to the driving head. The drill point is generally followed by a thread forming or cutting section integral with the screw thread of the shank. One possible application of these types of screws is to join cladding material (such as roofing and wall sheet metal cladding) to a frame member. A problem encountered with self drilling screws is that chips are produced by them when drilling through the cladding material and these chips tend to remain sprinkled on the outer surface of the cladding. In the case of roofing applications, these particles or chips produced during drilling can result in pitting corrosion of the roofing material due to galvanic action between the chips and the protective metallic coating, usually zinc or zinc aluminium alloy. In some cases the cladding is pre-coated with a paint which is also subject to discolouration or burning from the hot chips produced. Self drilling and tapping fastening devices usually have some form of resilient washer or seal under their head to achieve a watertight joint. This is particularly essential in the case of valley fixing of corrugated material.

The present invention aims at providing a washer which is capable of capturing and retaining chips of the aforementioned type, as they are formed. The washer in accordance with the present invention has the consequent advantage of preventing the previously described damaging effects from occuring.

In accordance with the present invention a washer is provided for use with a member having a drill point, said washer including means for receiving said member and means defining a cavity adapted to receive and retain particles produced during operation of said member.

The washer of the present invention is particularly adapted for use with drill pointed screw fastening elements and in accordance with this aspect there is provided a washer adapted for use with a screw fastening element having a drill point, said washer including means for receiving said fastening element, a diverging skirt portion defining a cavity arranged to receive and retain particles produced during operation of said fastening element, and means for locating said washer relative to said drill point. Preferably the means for receiving the fastening element comprises a bore passing through the skirt portion.

The washer body is conveniently produced from an elastomeric material such as a resilient or flexible plastics material or rubber. Typically the washer may be produced from E.P.D.M. rubber.

The previously mentioned means for locating the washer relative to the drill point of the screw member ensures that the washer is maintained in a position in use whereby it engages and is pressed against the outer surface of the sheet material into and through which the screw member is drilled so that chips produced during this step will be caught and retained in the cavity provided in the washer. Subsequent to the initial drilling action the screw thread of the screw member passing through the bore of the washer maintains downward pressure on the washer to ensure that the chips initially caught, are not released.

In accordance with several preferred embodiments described herein, the means for locating the washer relative to the drill point of the screw member takes different forms. According to one embodiment, the location means comprises a blind end of the bore for receiving the drill point of the screw member. The blind end of the bore is formed by a relatively thin diaphragm which may be easily penetrated by the screw member during application of the screw member. According to a second embodiment, the location means comprises an abutment, preferably formed as an annular abutment within the bore of the washer, which is capable of engaging the extremities of the screw thread region of the screw member. The abutment may be formed by an annular region surrounding the bore on an outer surface of the washer. The bore preferably is formed to have a friction fit on the drill point of the screw member, whereby the screw threads of the screw member will exert an axial or downward pressure on the washer. According to a third embodiment the free edge of the skirt portion of the washer is adapted to engage the free end surface of the drill point of the screw member and be located thereby. The skirt portion may be formed with a base portion having a generally frusto conical surface corresponding to the free end surface of the drill point, the base portion being open with a diameter being less than that of the width of the drill point and shank of the screw member. Alternatively the base of the skirt portion may be completely closed with at least an internal configuration corresponding to the free end surface of the drill point. In this embodiment, the drill point is located by the shaped base portion, and in use, the drill point penetrates the base portion.

In accordance with a further preferred embodiment, the chip receiving and retaining cavity of the washer may include a material or substance capable of securing particles produced during drilling, upon contact therewith. The material may be a sticky mastic like material or some other adhesive material.

The present invention also aims at providing a screw member having a driving head, a shank region which is at least partially threaded, a drill point and a washer as previously described received over and located on the drill point of the screw member.

The invention will be better understood from the following description of preferred embodiments thereof given in relation to the accompanying drawings. In the drawings:

FIG. 1 is a longitudinal cross-sectional view of a drill point screw having a chip retaining washer in accordance with the present invention;

FIG. 2 is a longitudinal cross-sectional view similar to FIG. 1 after the drill point screw of FIG. 1 has been applied to a corrugated sheet material;

FIG. 3 is a cross-section view of a further modified form of chip retaining washer in accordance with the present invention;

FIG. 4 is a longitudinal cross-sectional view of another preferred embodiment of the present invention in combination with a drill point screw member;

FIG. 5 illustrates in part the screw member and washer of FIG. 4 being inserted through a sheet metal roofing member;

FIG. 6 is a part view of a drill point screw member and washer in accordance with a further preferred embodiment of the present invention;

FIG. 7 is a longitudinal cross-sectional view of a washer and screw member according to another preferred embodiment;

FIG. 8 is a longitudinal cross-sectional view of another preferred embodiment; and FIG. 9 shows the washer of FIG. 8 in combination with a screw member.

Referring first to FIGS. 1 and 2 there is shown a self drilling and tapping fastening device 10 which may typically be used for fixing corrugated roofing material sheets 11 to a roof structural frame member 12. The fastening device 10 comprises a driving head 13, a shank 14 and a drill point 15 at the opposite end of the shank to the head. Along the shank 14 extending from the drill point 15 are respectively a self tapping thread region and a full screw thread region indicated be reference numeral 16. As shown in FIG. 2 the threaded region engages in the structural member 12. Conventionally, self drilling fastening devices of this type have included a substantially rigid metal washer and a resilient washer, the latter being provided to create a watertight seal. As previously described the problem with this type of fastening device is that the drill point creates drilling chips when passing through the roofing material 11 which are left on the outer surface and can cause serious damage to the roof together with an unsightly appearance to the roofing material.

To overcome the aforementioned problem with conventional fastening devices, the device described herein includes a washer member generally designated 20. The washer member 20 shown in FIG. 1 prior to the installation of the fastening device 10 consists of a concave member 21 formed from a plastics material or other semi rigid but flexible material in a generally conical shape defining a chip catching cavity 33, into which is filled a substance 22 capable of retaining chips upon contact therewith. The substance 22 may be a pliable and sticky mastic compound which substantially fills the complete cavity 33 within the concave member 21 including filling the drill flutes on the drill point 15 of the fastening device 10. It should, however, be appreciated that substance 22 is not essential to the operation of the washer 20.

When the fastening device 10 is applied, the outer conical shell 21 of the washer 20 acts as a shroud, and the outer base or free edge of the cone contacts the sheet cladding material 11 being drilled. Drill chips produced in applying the fastening device are captured as they are created within the cavity 33 formed by the shell 21 and may be held therein by the substance 22. When finally driven home, either the flanged head 13 of the fastening device or an additional dished shaped metallic or plastics material washer 23 seats over the conical washer 20, ensuring positive bearing between the conical washer 20, which has now flattened out somewhat, and the metal cladding 11. This arrangement is clearly illustrated in FIG. 2. The chip retaining material 22 with the chips embedded further assists the weatherproof sealing of the washer 20. After drilling through the outer cladding 11 and drilling into the structural member 12 (which may be a steel or wood frame member) loose chips produced on the inside of the cladding 11 are of no consequence.

A variety of suitable mastic compounds may be used for the chip retaining material 22 including any combination of bitumen, rubber and asbestos, or the use of butyl rubber mastic compounds. If desired, a two part mastic compound could be used, separated by a plastics or paper film, so that the rotary drilling action would rupture this causing the two components to mix and harden as with typical epoxy or polyester compounds and the like.

In an additional embodiment, it is possible to include a magnetic material or substance which is of advantage in securing metal chips within the outer shell 21 of the washer 20. Such a magnetic material may be a ferrite powder incorporated in the structure of the washer which will improve adhesion of the chips to the material.

The generally conical washer 20 may be made alternatively of natural of synthetic rubber compounds or any appropriate thermosetting or thermoplastic compound or metal.

It should also be appreciated that a chip catching washer in accordance with the present invention may be used with a conventional drill or any other drill pointed member other than a drill screw specifically described in the foregoing.

While it would be usual to apply chip catching washers as an assembly to a self drilling member (such as self drilling and/or tapping screws), it should be appreciated that the members could be assembled in the course of use by holding the chip catching washer on the cladding and using it as a guide for the drill pointed member.

Referring now to FIG. 3, there is illustrated a special form of washer 40 adapted to conform to the shape (corrugations) of the cladding material 11. The washer 40 consists of an open bore 44 adapted to receive the point and shank of a fastening device and a depending skirt region 41 diverging away therefrom. The skirt region 41 extends radially and then axially relative to the bore 44 whereby a bed like shroud is formed have a chip receiving cavity 33. The skirt region 41 subsequently diverges further to a relatively wide skirt portion 42 formed into a shape of a dome corresponding to the cross-sectional shape of the cladding material 11. The arrangement includes a resilient sealing washer 18 within the cavity 33 having a bore 45 generally aligned with the bore 44 and a mastic material 43.

The washer 18 is adapted to improve weatherproofing and the special format of the skirt 41,42 acts to increase the tearing load resistance for the cladding material sheet 11. This shaping makes the washer particularly suitable for use in cyclone prone areas. It should however be appreciated that the wide shaped skirt portion 42 might be removed where improved tearing resistance is not required.

The outer washer 40 and the inner washer 18 may, in some cases, be applied to the roof separately to the self drilling fastening device. In this application the washer assembly may be first placed on the roof in location and the screw fastening device inserted into it and driven having the advantage that the washer assists in acting as a guide and steady to the drilling and during operation by the operator holding the washer.

Referring now to FIG. 4 there is shown a further alternative embodiment according to the present invention. The arrangement includes a fastening device 10 having a drill point 15, a driving head 13 and a loose metal or other rigid material washer 23. In this embodiment a wood screw fastening device is illustrated rather than the metal screw device shown in FIGS. 1 and 2. A washer in accordance with this embodiment is indicated by reference numeral 50 and is shown in FIG. 5 applied over and generally surrounding the drill point 15.

The washer 50 is generally cup shaped in the undeformed condition shown in FIG. 4. The washer 50 includes an upper bore 51 surrounding the shank 14 of the screw member 10 and is frictionally engaged there against. The bore 51 further includes a restriction or an annular abutment 52 engageable with the thread region of the screw member which assists in maintaining the washer against the panel 11 during the initial stages of insertion of the screw member 10. The cross-section thickness of the washer 50 is generally greatest adjacent its upper bore 51, that is, surrounding the screw stem and decreases in thickness as the washer extends downwardly away from the screw stem and then back underneath the drill point 15 to define a relatively thin but closed base region 53 of the washer. The base region 53 conforms in shape to the free end surface 17 of the drill point 15 and acts to locate the screw drill point ready for use. The shape of the walls of the washer 50 is such that an open cavity 54 is defined laterally surrounding the drill point of the screw member. As is shown in FIG. 5, when in use, the screw member readily penetrates the base region 53 of the washer 50 and commences to drill through the sheet metal wall of the roofing panel 11. During this operation, the fastening device 10 and washer 50 rotate and metal chips 55 produced during the drilling step are, through centrifugal effect, caught and retained in the cavity 54. Upon continued insertion of the screw member, either the head 13 or the loose washer 23 engages against the upper or thicker region of the washer 50 and collapses the washer cavity 54 such that the base 53 of the washer is urged towards the upper wall of the washer with the metal chips caught therebetween.

FIG. 6 of the accompanying drawings illustrates an alternative embodiment similar to that of FIGS. 4 and 5 with the exception that the base wall 53 of the washer 50 includes a central aperture 56 through which the point or edge of the drill point end surface 53 penetrates. The aperture 56 is generally of smaller area than the cross-sectional area of the stem of the screw member, however, the drill point 15, in use, initially contacts the sheet metal to which it is to be applied. Further the free lip edges of the washer 50 surrounding aperture 56 may be used to locate the washer on the drill point 15. When the screw member 10 and washer are combined, the walls of the upper bore 51 are preferably gripped on the stem of the screw to ensure correct positioning of the washer prior to use.

FIG. 7 shows a further alternative preferrd embodiment of a washer 80 in accordance with the present invention. In this embodiment, the upper bore 81 may also grip to the stem of the screw. The washer 80 is generally bell shaped in cross-section with its cross-section thickness decreasing from the upper region to its free outer lip region 87 such that a cavity 84 is defined surrounding the drill point 15. However, in this embodiment, the cavity 84 opens downwardly or axially. An adhesive material 88 is located on the inwardly facing surface of the skirt portion of the washer 80. In this arrangement, chips formed during application of the screw member 10 are caught and retained within the cavity 84 with the assistance of the adhesive 88. In this embodiment, the outer free end 87 of the washer 80 may be collapsed inwardly towards the screw shank 14 or outwardly away therefrom when pressed against the cladding material 11 in the applied position thereof.

Furthermore the bore 81 of the washer 80 may include an abutment or a restriction such as a frusto conical shaped region in the throat of the bore which engages against the lower extent of the screw thread section of the screw member. This arrangement assists in maintaining the washer against the panel 11 during the initial stages of insertion of the screw member 10.

Referring now to FIG. 8 there is illustrated a further preferred embodiment of a chip catching washer 90 having an internal axially extending bore 91 adapted to receive the point of a self drilling screw member which may be as shown be reference numeral 10 in FIG. 9. The bore 91 has a cross-sectional shape generally corresponding to the point of the screw member 10 in association with which the washer is intended to be used. The bore 91 is closed by a thin diaphragm or cover 95 to form a blind end having a shape corresponding to the drill point free end surface which is intended to be used with the washer. The bore 91 and the diaphragm 95 act to positively locate the drill point of the screw member relative thereto. Preferably also the bore 91 should have sufficient length to engage at least the end of the thread region 16 of screw member 10 whereby the washer may be positively retained on the drill point ready for use. Furthermore as shown in FIG. 8 the bore 91 is slightly tapered to provide a friction force against the drill point 15 of member 10 so that the washer 90 may be frictionally and elastically retained thereon.

The chip catching washer further includes a depending diverging skirt portion 92 located generally around the bore 91 and forming a cavity 94 between the walls of the bore 91 and the walls of the skirt portion 92. The skirt portion 92 terminates in a lip 93 having an acute angle forming a sharp edge which is facing in a generally axial direction. Preferably the surfaces forming the acute angle of said lip 93 form an angle less than 45° with the axis of the bore 91. Advantageously the internal surface of said lip is substantially parallel with the axis of said bore 91. The drill point cover 95 is axially spaced by a distance 96 from the free edge of the lip 93. In this way it is ensured that the lip 93 seals against the surface through which the screw member 10 is to pass prior to the point 97 of the cover 95 pushing into contact with said surface. The diaphragm or cover 95 is sufficiently thin to allow the screw member to easily penetrate therethrough. Subsequently the cover 95 is broken up by the screw member and the screw member commences to drill through the surface to which the screw member is applied. The cavity 94 as shown in FIG. 8 includes a relatively large or bulbous free region which is sufficient to retain and hold all chips produced by action of the screw member without those chips producing a substantial pressure against the lip 93.

As shown in FIG. 9, the screw member, as with previously described embodiments, may also include a free washer 23 and a driving head 13. The washer 23 may be integrally formed with the head 13. In either case the washer 23 has a dished configuration adapted to press against the upper surface of the washer 90.

In accordance with a further aspect, any of the previously described embodiments employing a mastic or adhesive like substance in the chip retaining cavity, may also include a zinc powder or like material distributed therein to provide cathodic protection for the chips once captured to ensure that they do not corrode and possibly in so doing force their way out of the washer cavity.

We claim:

1. A washer of elastomeric material adapted for use with a fastening element of the type having a head, an at least partially screw threaded shank and a drill point wherein the washer includes means for forming a seal between the head of the fastening element and a surface through which the fastening element passes, said washer including a bore arranged to receive the drill point of the fastening element, a skirt portion surrounding and extending generally axially of said bore and defining a cavity contiguous with said bore of sufficient volume to contain particles as they are produced during the drilling phase of operation of the fastening element formed on said surface through which the fastening element passes, said cavity being adjacent to and annularly spaced from the axis of said bore, and location means for positioning the washer relative to said drill point whereby in use at least a part of said skirt portion surrounding the drill point is held against said surface to prevent escape of said particles produced during the drilling phase of operation of the fastening element with said particles being received and retained in said cavity, and means associated with said cavity for retaining the particles therein.

2. A washer according to claim 1 wherein said location means comprises an abutment positioned within said bore.

3. A washer according to claim 2 wherein said abutment comprises a blind end of said bore.

4. A washer according to claim 1 wherein said location means and said particle retaining means include a lower region of said skirt portion which converges such that it will engage against the drill point of the fastening element.

5. A washer according to claim 4 wherein said lower region of said skirt portion forms a closed surface adapted for engagement with the drill point of the fastening element whereby in use said closed surface is penetrated by the drill point.

6. A washer according to claim 1 wherein the skirt portion terminates in a sharp free edge surrounding the axis of said bore with the free edge adapted to be axially spaced beyond the free end of the drill point when located on the fastening element such that in use said free edge is resiliently pressed against the surface to prevent particles escaping from the cavity.

7. A washer according to claim 6 wherein the bore has a blind end axially spaced from the free edge of said skirt region.

8. A washer according to claim 6 wherein said skirt converges inwardly toward the axis of said bore adjacent said sharp free edge.

9. A washer according to claim 6 wherein said means associated with said cavity comprises a mastic or adhesive material arranged within said cavity.

10. A screw member having a driving head, a shank region which is at least partially screw threaded, a drill point at the end of said shank region opposite to said head, and a washer according to claim 1 received over and located on said drill point.

11. A screw member according to claim 10 further including a second rigid dished shaped washer either loosely surrounding said shank region or integrally formed with said driving head.

12. A screw member according to claim 10 wherein the skirt portion of the washer terminates in a free edge surrounding the axis of said shank region and said bore includes a blind end engaging the drill point of the screw member, the free edge of the skirt portion extending axially beyond the blind end of the bore.

13. A screw member according to claim 10 wherein the skirt portion of the washer includes a lower converging region, and at least a part of said lower converging region being engaged against the drill point of the screw member.

* * * * *